United States Patent [19]

Stockum

[11] 4,135,867
[45] Jan. 23, 1979

[54] FORM FOR MAKING A GLOVE

[75] Inventor: Glenn F. Stockum, Arlington, Tex.

[73] Assignee: Arbrook, Inc., Arlington, Tex.

[21] Appl. No.: 787,239

[22] Filed: Apr. 13, 1977

Related U.S. Application Data

[62] Division of Ser. No. 724,491, Sep. 20, 1976, Pat. No. 4,047,251.

[51] Int. Cl.² .................................................. B29C 13/00
[52] U.S. Cl. ..................................... 425/275; 425/470; 2/168
[58] Field of Search .................... 425/275, 93, 470; 2/159, 162, 168

[56] References Cited

U.S. PATENT DOCUMENTS

| | | | |
|---|---|---|---|
| 1,931,324 | 10/1933 | Newton | 425/275 X |
| 2,100,572 | 11/1937 | Spanel | 425/275 |
| 2,100,578 | 11/1937 | Spanel | 425/275 |
| 2,389,319 | 11/1945 | McMordie et al. | 2/168 X |
| 2,451,758 | 10/1948 | Malm | 425/275 X |
| 3,268,647 | 8/1966 | Hayes et al. | 425/275 X |

*Primary Examiner*—Robert L. Spicer, Jr.

[57] ABSTRACT

A uniquely contoured glove adapted to tightly conform to a wearer's hand is made by depositing an elastomeric material on a relatively flat glove form having recessed areas covering substantially the entire surface of the hand-forming and finger-forming portions of the form except for a peripheral edge surrounding the recessed areas. The resulting glove, when stripped from the form and reversed, has a hand portion, an open end cuff portion and a plurality of elongated finger-receiving compartments, each of said compartments and said hand portion having a transverse cross-sectional configuration formed by four outwardly curved sections connected by four inwardly curved sections.

3 Claims, 12 Drawing Figures

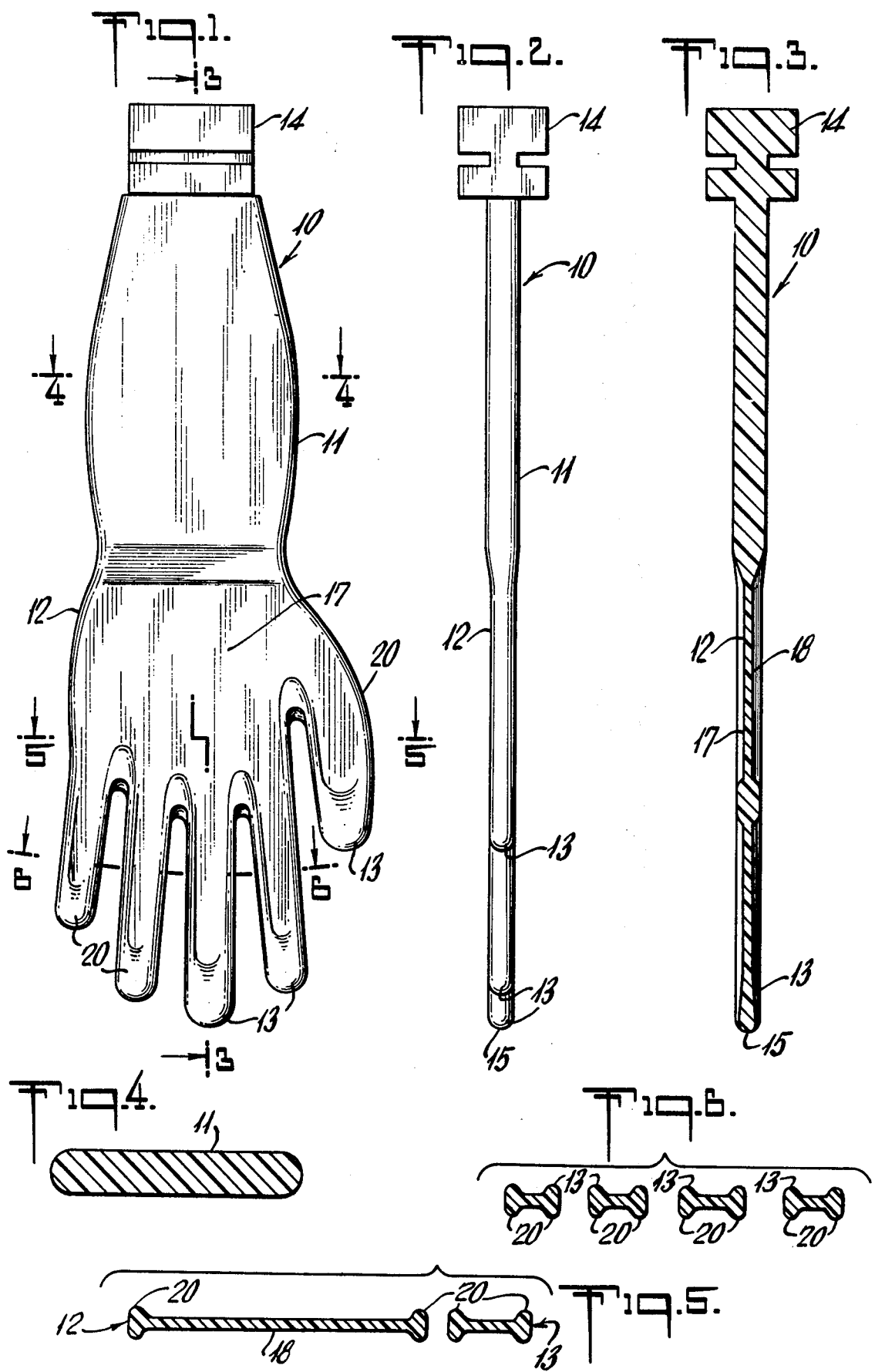

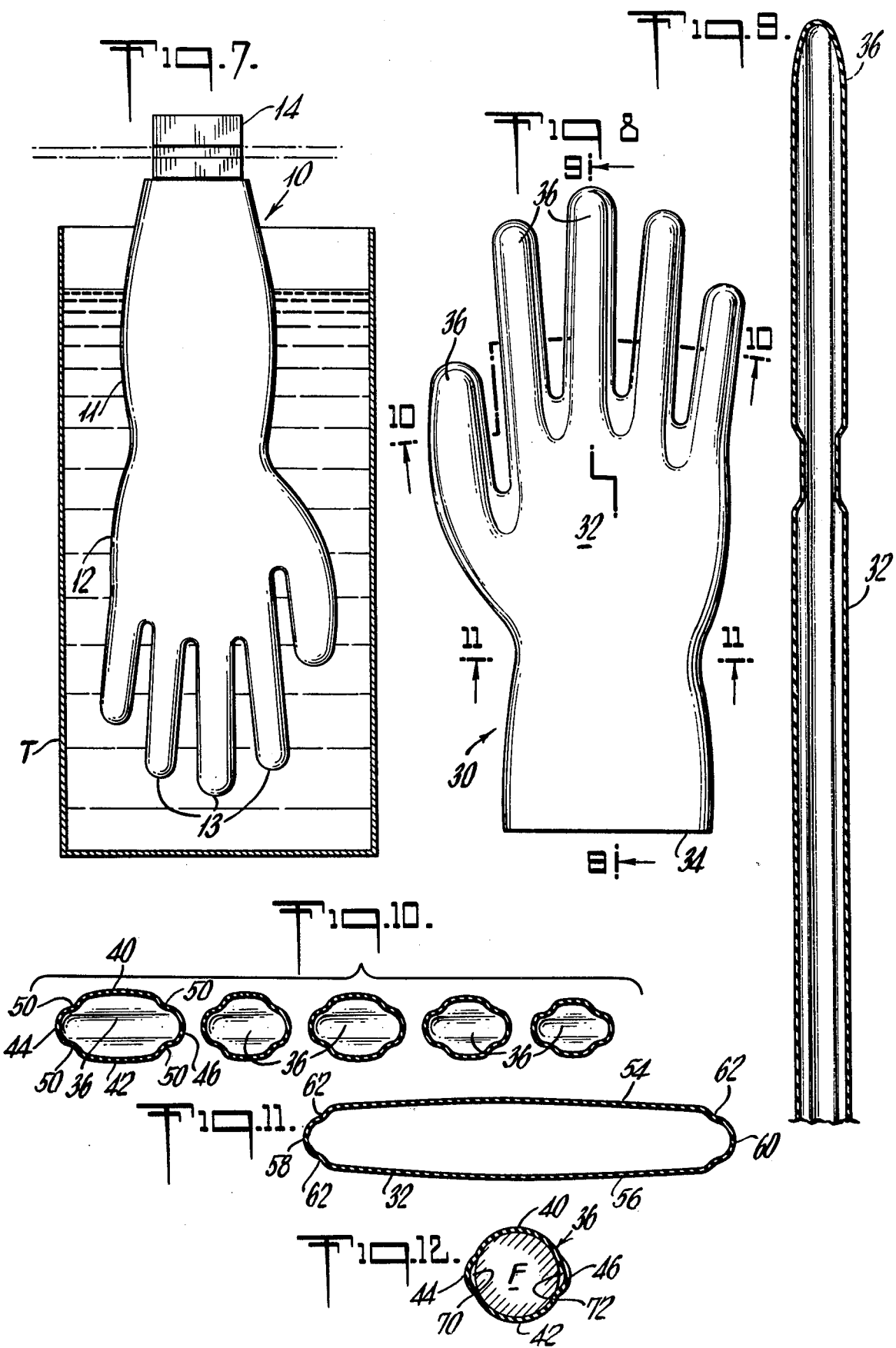

FORM FOR MAKING A GLOVE

This is a division of application Ser. No. 724,491, filed Sept. 20, 1976, now U.S. Pat. No. 4,047,251.

BACKGROUND OF THE INVENTION

This invention relates to a unique glove structure and to the apparatus and method for making the glove structure.

For many years, surgical gloves and non-supported household gloves have been made by a process which involves dipping a smooth surfaced porcelain or aluminum glove form fashioned to resemble, to a large degree, the human hand into a solution of latex coagulant (usually a solution of calcium nitrate in alcohol), drying the latex coagulant and then immersing the form into a latex compound. After depositing the layer of latex compound on the forms, the forms are usually rotated throughout the period of time necessary for the coagulant to react with and gel the latex film. This rotation equalizes any wet latex runs and assures a more uniform overall guage in the finished glove. After the film is gelled, it is leached with water or steam to remove any water soluble materials from the deposit, dried, vulcanized and stripped from the glove as a finished glove.

Glove forms historically have been shaped to resemble, as nearly as possible, the human hand. This is to say, the glove forms available on the market generally resemble a hand, especially in cross section, with the fingers and palm portions being round or elliptical in cross-section and the base or cuff portion of the form being generally round.

Although the finished rubber or plastic glove conventionally made on such forms resembles in overall contour, the mold on which it was dipped, it is not usually economically feasible to market a glove which is oriented precisely as dipped. This is because removal of the glove from the form is usually effected by pulling the glove off of the form cuff end first, fingertips last, thereby reversing the glove. Since the gloves are normally thin and extremely pliable, reversing them does not substantially alter their functionality. Consequently, most thin dipped gloves marketed today are reversed from the way they were dipped. This concession to the economics of manufacture is harmful to the serviceability of the glove in a number of ways.

It has been found that elastomers age best in the static state, that is to say, all other factors being equal, a latex rubber article which is maintained exactly as molded or dipped will age better than a similar article which is stretched or distorted. A reversed glove presents certain areas which are stressed because of the inherent "memory" of rubber or plastic. These areas usually are manifested as sharp creases in the film. Viewing a glove in repose, these areas are usually in the crotches and along the sides of the gloves. Gloves which are especially sensitive to aging influences, such as natural rubber, cis polyisoprene and blends thereof will quickly crack and generally degrade in the areas outlined when exposed to the deleterious effects of oxygen, ozone or ultraviolet radiation, or to any combinations of these. Consequently, it is desirable to avoid any such sharp creases in the finished glove product if at all possible.

Another significant disadvantage of the glove structure made in accordance with conventional manufacturing techniques is the difficulty of donning such gloves. Since these gloves are primarily intended to conform closely to the skin of the wearer, the glove is normally smaller than the wearer's hand and must, therefore, be stretched in order to place the glove on the hand. Conventionally formed gloves having round or elliptically shaped finger compartments have the inherent disadvantage that air will become entrapped in the finger compartments during insertion of a wearer's hand. This characteristic impedes the donning of the glove, in that venting of the entrapped air is extremely difficult.

In addition to the disadvantages associated with the glove product produced by conventional glove-making techniques, set forth below are a number of disadvantages associated with the use of the equipment itself:

1. Because the glove forms are generally shaped in the configuration of a human hand, there is a relatively large surface area on the form which is parallel to the liquid interface during dipping. Surfaces parallel to the liquid tend to trap air during dipping causing voids or blisters in the film. These relatively large surfaces parallel to the liquid interface also slow the dipping time and thereby increases the overall machine time. Customarily, these surfaces are so prone to air entrapment the dip mechanism must be automatically sequenced to enter the liquids (coagulant and latex) at much reduced speeds in the areas of the fingertips and crotches, the remainder of the glove being dipped much faster.

2. Because gloves of the type contemplated by the present invention are normally provided in different sizes, it therefore must follow that the glove-making forms will be of different sizes. Therefore, the latex displacement within the dipping tank will vary substantially from one size form to another. This variation in dipping levels created by the different sized forms is considered to be very undesirable during a manufacturing operation.

3. The rounded forms which conform generally to the contour of the human hand are relatively bulky forms and therefore have the disadvantages of (a) relatively high mold cost, (b) less efficient and non-uniform heat transfer (since these forms are conventionally hollow), (c) greatly reduced machine capacity occasioned by the necessity to utilize many closely spaced forms during a single dipping operation, and (d) the rounded forms, because of their bulk, are relatively heavy in weight.

An additional factor which has long been a problem in the manufacture of gloves by conventional techniques is the difficulty in stripping, or otherwise removing, the cured glove product from the glove-making form. Since conventional forms have been, as stated above, constructed to conform generally to the overall contour of a human hand, the elastomeric material deposited on the form has a convex configuration which tends to cling tightly to the form and impedes the stripping operation. This is a very important step in the overall glove-making procedure in that it has conventionally been a hand operation and, therefore, contributes greatly to the overall cost of the glove product. Therefore, improved techniques for stripping and handling the finished glove products has long been sought.

SUMMARY OF THE INVENTION

The foregoing and other disadvantages associated with the use of conventional glove-forming equipment and the gloves made thereon are eliminated, or greatly reduced, by the present invention which provides a uniquely contoured glove which contains virtually no stressed areas, such as sharp creases, which may be deleterious to the elastomeric material during aging. The glove of the present invention has been found to be much less prone to folding or creasing of the elastomeric material in either the as-dipped configuration or in the reversed configuration. This is believed to be due to the smaller radii of the edges of the form on which the glove is deposited, creating a corresponding radii in the finished glove which is more resistant to distortion and creasing. In addition, because of the unique transverse cross-sectional configuration of the finger compartments of the glove, the glove, during insertion of the fingers of a wearer into the finger compartments, has a natural tendency to vent air and, thus, to facilitate the donning of the glove.

The glove of the present invention is preferably made on a glove form having a thickness substantially less than the thickness of a conventional glove form. This relatively thin, or flat, glove form configuration contributes greatly to the elimination of many of the disadvantages associated with prior glove-making equipment. For example, the flat construction of the glove forms permits the use of a larger number of forms during a single dipping operation. Also, because the size of the form is smaller than a conventional glove form it will be lighter in weight and provide more efficient and uniform heat transfer during the glove-making operation. Also, faster dipping times are achievable because the flat form configuration presents smaller surfaces which are parallel to the liquid interface during the dipping operation and thus may expedite and decrease the time required to perform a single dipping procedure. As mentioned before, it is desirable to reduce the surface areas parallel to the liquid in order to avoid the entrapment of air at particularly the fingertip and finger crotch areas. This is achieved in accordance with the unique glove form of the present invention.

The relatively thin, flat configuration of the unique glove form of the present invention is achievable by providing recesses covering substantially the entire surface of the hand-forming and finger-forming portions of the form except for a peripheral edge surrounding the recesses. The area of these recesses in combination with the area of the peripheral edge surrounding the recesses equals the total area of the hand and fingers of the glove to be made thereon. Thus, although the thickness of the glove form is substantially less than the thickness of a conventional glove form, the overall surface area of the glove formed thereon is essentially the same as the area of a conventional glove.

The unique glove of the present invention is made by providing a glove form having the general contour of a human hand with recesses on both sides thereof in the back and palm areas and extending into the finger area. It should be noted, that for purposes of the description contained in this application, the word "finger" or "fingers" is intended to include the four fingers and thumb of a human hand. The glove form described above has an elastomeric material deposited thereon to form an elastomeric glove. The glove is preferably partially cured following the deposition of the elastomeric material and is then stripped from the form. Conventionally, the stripping operation also results in the reversing of the glove so that the glove surface originally in contact with the form is positioned on the outside of the glove. Consequently, the areas of the glove formed in the recesses of the glove form have a tendency, when reversed, to bow outwardly to provide a convex surface which facilitates the donning and enhances the appearance of the glove. Creases and other areas of stress are essentially eliminated, or reduced, and the glove will age in a manner superior to conventional gloves.

The present invention has many features and advantages which will be discussed or will become apparent from the following more detailed description of preferred embodiments thereof.

BRIEF DESCRIPTION OF THE DRAWINGS

With reference to the accompanying sheets of drawings:

FIG. 1 is a plan view of a glove form of the present invention utilized to make the unique glove structure of the present invention;

FIG. 2 is a side view of the glove form of FIG. 1;

FIG. 3 is a cross sectional view taken along line 3—3 in FIG. 1;

FIG. 4 is a cross sectional view taken along line 4—4 in FIG. 1;

FIG. 5 is a cross sectional view taken along line 5—5 in FIG. 1;

FIG. 6 is a cross sectional view taken along line 6—6 in FIG. 1;

FIG. 7 illustrates the deposition of elastomeric material onto the glove form of FIG. 1;

FIG. 8 is a plan view of the unique glove of the present invention;

FIG. 9 is a cross sectional view taken along line 9—9 in FIG. 8;

FIG. 10 is a cross sectional view taken along line 10—10 in FIG. 8;

FIG. 11 is a cross sectional view taken along line 11—11 in FIG. 8; and

FIG. 12 is a cross sectional view illustrating the insertion of a finger into one of the finger compartments of FIG. 10.

DETAILED DESCRIPTION OF THE PREFERRED EMBODIMENTS

With reference to the accompanying drawings, FIGS. 1 through 6 illustrate the preferred embodiment of the unique glove form of the present invention, generally referred to by the reference numeral 10. Form 10 has a cuff-forming portion 11, a hand-forming portion 12 and finger-forming portions 13. At the end of form 10 remote from finger-forming portions 13, is provided a mounting block 14 which may be utilized to attach form 10 to a rack, or other similar support member, on the glove-making equipment. For purposes of convenience the additional glove-making equipment has not been illustrated herein since it will be recognized that such equipment is well known in the art and the unique glove form 10 has applicability with virtually all types of equipment used in the dipping and other elastomeric deposition of gloves of the general type contemplated by this invention.

The overall thickness of form 10, as best seen in FIGS. 2 and 3, is extremely small compared with that of conventional glove-making forms. This thickness in the cuff area of form 10 can be approximately ¼" as compared with about 2¼" for conventional glove forms. Form 10 is essentially uniform in thickness from block 14 to the tips 15 of finger-forming portions 13, except for the recesses 17 and 18 formed in opposed sides of hand-forming portion 12 and extending continuously into each of the finger-forming portions 13. Recesses 17 and 18 cover essentially the entire surfaces of hand-forming portion 12 and finger forming portions 13 except for a peripheral edge 20 which surrounds said recesses. The dimensions of peripheral edge 20 are not critical; however, the edge is preferably smoothly curved to avoid any sharp edges that could result in pinholes or other failures in the elastomeric material deposited on form 10.

Although form 10 is much narrower than conventional glove forms, it will be appreciated that recesses 17 and 18 provide additional surface area which, when combined with the surface area of peripheral edge 20, equals the desired surface area of the elastomeric glove made thereon. In a conventional glove form the surface area of the glove provided by recesses 17 and 18 would be formed by outwardly curved sections of the glove form as opposed to the inwardly curved, or concave, sections 17 and 18.

The configuration of form 10 is obviously very important to the present invention in that it permits the elimination of many of the disadvantages associated with conventional glove forms. For example, the relatively thin form enables the use of a much larger number of forms on a single glove making assembly. Other economic advantages are achieved by reducing the mold costs necessary to produce the relatively small forms; the reduction of power required to manipulate the forms; and the efficiency and uniformity of heat transfer achievable with a solid form of the type contemplated by this invention, as opposed to a conventional form.

The unique glove of the present invention is illustrated generally at 30 in FIG. 8 and is shown to have a hand portion 32, an open end cuff portion 34 and a plurality of elongated finger-receiving compartments 36. The transverse cross sectional configuration of each finger compartment 36 is illustrated in FIG. 10, wherein each compartment has a top curved section 40, a bottom curved section 42 and opposed curved side sections 44 and 46. Top section 40 and bottom section 42 are formed, respectively, by recesses 17 and 18 formed in the opposed sides of glove form 10. Since the preferred embodiment of the glove form has been illustrated herein as being symmetrical, the terms "top" and "bottom" have been selected for use in this application merely as being representative of the back and palm sections of the hand. It will be appreciated that other configurations may be utilized for glove form 10 if so desired.

Opposed curved side sections 44 and 46 on each of finger-receiving compartments 36, are formed by peripheral edge 20 of glove form 10 and, consequently, have a much sharper curve than top section 40 and bottom section 42. As seen in FIG. 10, each pair of adjacent curved sections is connected by an inwardly curved, or concave, section 50. Thus, the transverse cross sectional configuration of finger-receiving compartments 36 may be described as having alternating convex and concave curvatures extending around the circumference thereof.

Referring to FIG. 11, since hand portion 32 is also primarily formed by recesses 17 and 18 in glove form 10, it also will have a convexly curved top section 54, a convexly curved bottom section 56 and two opposed curved side sections 58 and 60. These sections are also connected by inwardly curved sections 62.

Although glove 30 is made on a uniquely designed glove form, it will be appreciated that the final glove configuration, e.g., the finger length, and other dimensional characteristics, are essentially the same as those of a conventionally formed glove.

Referring to FIG. 12, one of finger-receiving compartments 36 is illustrated in cross section with a finger F of a wearer partially inserted therein. Because of the unique configuration of finger-receiving compartments 36, curved side sections 44 and 46 have a tendency to protrude outwardly to form air-venting channels 70 and 72 to assist in the elimination of air from the compartment during the glove-donning procedure. Elastomeric gloves of the type contemplated by this invention are designed to tightly conform to the skin of a wearer's hand and fingers and, therefore, this aspect of the present invention is very significant in that it greatly contributes to the elimination of entrapped air that has traditionally been a problem in this field.

The unique glove illustrated in FIG. 8 is constructed by depositing on form 10 a layer or layers of elastomeric material. The preferred elastomeric material usable with this invention is natural rubber latex and it is deposited in a somewhat conventional manner utilizing a latex dipping procedure which is well known in the prior art. Although glove form 10 may be constructed of porcelain, aluminum or other suitable materials, the preferred material of construction is polypropylene. Because of the unique flat, solid structure of glove form 10, it is possible to utilize materials that have not heretofore been available in the molding of elastomeric gloves.

Referring to FIG. 7, glove form 10 is illustrated in an immersed condition within a latex dipping tank T filled with natural rubber latex. After a suitable dwell time within tank T glove form 10 is removed and subjected to the conventional procedures of drying and curing. Following the curing operation, glove form 30 may be stripped from form 10 and reversed to form the glove illustrated in FIG. 8. In actual practice, the reversing procedure is usually accomplished concurrently with the stripping procedure. Because of the unique concave configuration of form 10, during the drying and curing operation the elastomeric material of glove 30 will separate from form 10 to, thus, facilitate the stripping operation. In conventionally formed gloves, the elastomeric material adheres tightly to the glove form because the form is essentially convex on all of its surfaces. The concave recesses formed on both sides of glove form 10 provide a natural release means for the elastomeric material in that it tends to pull away from the recesses during the drying and curing operation.

While the invention has been described in connection with the preferred embodiment thereof, it will be appreciated by those skilled in the art that various changes and modifications can be made without departing from its spirit. It is therefore intended that the coverage afforded applicant be limited only by the claims and their equivalents.

I claim:

1. A form on which elastomeric material may be deposited for making gloves, said form having a hand-forming portion, a cuff-forming portion and a plurality of finger-forming portions, all of said finger-forming portions being oriented in substantially the same plane as said hand-forming portion, said finger-forming and hand-forming portions having a recess of uniform thickness formed in both sides thereof which extends into each of said finger-forming portions and which covers the entire surfaces of said hand-forming and finger-forming portions except for a peripheral edge which surrounds said recess.

2. The form of claim 1, wherein said peripheral edge is smoothly contoured.

3. The form of claim 2, wherein the combined areas of said recesses and said peripheral edge equals the desired total area of the hand and fingers of the glove to be formed thereon.

* * * * *